(12) United States Patent
Kim

(10) Patent No.: US 12,470,590 B2
(45) Date of Patent: Nov. 11, 2025

(54) APPARATUS FOR CONTROLLING VEHICLE AND METHOD FOR THE SAME

(71) Applicants: Hyundai Motor Company, Seoul (KR); Kia Corporation, Seoul (KR)

(72) Inventor: Dae Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 18/203,298

(22) Filed: May 30, 2023

(65) Prior Publication Data

US 2024/0205261 A1  Jun. 20, 2024

(30) Foreign Application Priority Data

Dec. 14, 2022 (KR) .......................... 10-2022-0175185

(51) Int. Cl.
*H04L 9/40* (2022.01)
*B60R 16/023* (2006.01)
*B60W 10/18* (2012.01)
*B60W 10/20* (2006.01)
*B60W 30/10* (2006.01)
*B60W 50/04* (2006.01)

(52) U.S. Cl.
CPC ...... *H04L 63/1441* (2013.01); *B60R 16/0231* (2013.01); *B60W 10/18* (2013.01); *B60W 10/20* (2013.01); *B60W 30/10* (2013.01); *B60W 50/045* (2013.01)

(58) Field of Classification Search
CPC .................................................. H04L 63/1441
See application file for complete search history.

(56) References Cited

U.S. PATENT DOCUMENTS

| 10,599,155 | B1* | 3/2020 | Konrardy | B60W 10/20 |
| 11,479,245 | B2* | 10/2022 | Kong | B60W 30/18145 |
| 11,985,150 | B2* | 5/2024 | Bajpai | H04L 67/12 |
| 2024/0202327 | A1* | 6/2024 | Kim | G06F 21/554 |
| 2024/0205261 | A1* | 6/2024 | Kim | H04L 63/1441 |

* cited by examiner

Primary Examiner — Michael A Berns
(74) Attorney, Agent, or Firm — Banner & Witcoff, Ltd.

(57) ABSTRACT

An apparatus for controlling a vehicle and a method for the same are provided. The apparatus includes a plurality of controllers configured to control the vehicle, a hacking monitoring system to monitor a hacking attempt against the vehicle, and a vehicle control device to detect a safety zone in front of the vehicle, set an entry path for entering the safety zone, and adjust, based on detecting the hacking attempt and based on an entry state to the entry path, performance of the plurality of controllers.

20 Claims, 11 Drawing Sheets

| LEVEL | NAME | EXECUTION OF STEERING & ACCELERATION/DECELERATION | MONITORING OF DRIVING ENVIRONMENT | FALLBACK PERFORMANCE OF DYNAMIC DRIVING TASK | SYSTEM CAPABILITY (DRIVING MODES) |
|---|---|---|---|---|---|
| 0 | NO AUTOMATION | HUMAN DRIVER | HUMAN DRIVER | HUMAN DRIVER | N/A |
| 1 | DRIVER ASSISTANCE | HUMAN DRIVER & SYSTEM | HUMAN DRIVER | HUMAN DRIVER | SOME DRIVING MODES |
| 2 | PARTIAL AUTOMATION | SYSTEM | HUMAN DRIVER | HUMAN DRIVER | SOME DRIVING MODES |
| 3 | CONDITIONAL AUTOMATION | SYSTEM | SYSTEM | HUMAN DRIVER | SOME DRIVING MODES |
| 4 | HIGH AUTOMATION | SYSTEM | SYSTEM | SYSTEM | SOME DRIVING MODES |
| 5 | FULL AUTOMATION | SYSTEM | SYSTEM | SYSTEM | ALL DRIVING MODES |

FIG.2

| CATEGORY | CONTROLLER | WHEN FOLLOWING CONTROLLER IS HACKED | | | | | | | |
|---|---|---|---|---|---|---|---|---|---|
| | | ECT, TCU HACKED | BRAKE HACKED | STEERING HACKED | ADAS HACKED | GATEWAY HACKED | DCU HACKED | V2X(RSU) HACKED | AVN HACKED |
| LONGITUDINAL ACCELERATION | ECU(MCU)(MOTOR), FCU(FUEL CELL), TCU | RISK MINIMIZATION | NORMAL OPERATION TO SAFETY REGION | ACCELERATION FAILED | ACCELERATION FAILED | ACCELERATION FAILED | NORMAL OPERATION IN SPECIFIC REGION | NORMAL OPERATION IN SPECIFIC REGION | NORMAL OPERATION |
| LONGITUDINAL DECELERATION | BRAKE CONTROLLER | X | RISK MINIMIZATION | BRAKE LOCKED AFTER SPECIFIC TIME | BRAKE LOCKED AFTER SPECIFIC TIME | BRAKE LOCKED AFTER SPECIFIC TIME | NORMAL OPERATION IN SPECIFIC REGION | NORMAL OPERATION IN SPECIFIC REGION | NORMAL OPERATION |
| LATERAL DIRECTION | STEERING CONTROLLER | NORMAL OPERATION TO SAFETY REGION | NORMAL OPERATION TO SAFETY REGION | X | LOCKED AFTER SPECIFIC TIME | LOCKED AFTER SPECIFIC TIME | NORMAL OPERATION IN SPECIFIC REGION | NORMAL OPERATION IN SPECIFIC REGION | NORMAL OPERATION |
| AUTOMATION | ADAS CONTROLLER | NORMAL OPERATION TO SAFETY REGION | NORMAL OPERATION TO SAFETY REGION | FUNCTION STOPPED AFTER SPECIFIC TIME | X | FUNCTION STOPPED AFTER SPECIFIC TIME | NORMAL OPERATION IN SPECIFIC REGION | NORMAL OPERATION IN SPECIFIC REGION | NORMAL OPERATION |
| VEHICLE NETWORK | GATEWAY | NORMAL OPERATION | NORMAL OPERATION | NORMAL OPERATION | NORMAL OPERATION | X | NORMAL OPERATION | NORMAL OPERATION | NORMAL OPERATION |
| EXTERNAL COMMUNICATION | DCU | NORMAL OPERATION | NORMAL OPERATION | NORMAL OPERATION | NORMAL OPERATION | NORMAL OPERATION | X | NORMAL OPERATION | NORMAL OPERATION |
| EXTERNAL COMMUNICATION | V2X (RSU) | EXTERNAL INFRA. NOTIFICATION MESSAGE TRANSMITTED TO VEHICLE | EXTERNAL INFRA. NOTIFICATION MESSAGE TRANSMITTED TO VEHICLE | EXTERNAL INFRA. NOTIFICATION MESSAGE TRANSMITTED TO VEHICLE | EXTERNAL INFRA. NOTIFICATION MESSAGE TRANSMITTED TO VEHICLE | EXTERNAL INFRA. NOTIFICATION MESSAGE TRANSMITTED TO VEHICLE | EXTERNAL INFRA. NOTIFICATION MESSAGE TRANSMITTED TO VEHICLE | X | EXTERNAL INFRA. NOTIFICATION MESSAGE TRANSMITTED TO VEHICLE |
| INFORMATION | AVN | HACKING EXPOSED | HACKING EXPOSED | HACKING EXPOSED | HACKING EXPOSED | HACKING EXPOSED | HACKING EXPOSED | HACKING EXPOSED | X |

FIG. 8

APPARATUS FOR CONTROLLING VEHICLE AND METHOD FOR THE SAME

CROSS-REFERENCE TO RELATED APPLICATION

This application claims the benefit of priority to Korean Patent Application No. 10-2022-0175185, filed in the Korean Intellectual Property Office on Dec. 14, 2022, the entire contents of which are incorporated herein by reference.

TECHNICAL FIELD

The present disclosure relates to an apparatus for controlling a vehicle, and a method for the same, and more particularly, relates to an apparatus for controlling a vehicle and a method for the same, capable of coping with cyber hacking, when the cyber hacking occurs in the vehicle.

BACKGROUND

As described above, the principle of classifying technical levels of an autonomous driving system is based on an ability to control steering and acceleration-deceleration, a monitoring ability of a driving environment, a fallback ability under a dynamic driving task (DDT) environment, and an operational design domain (ODD) range.

The autonomous driving technologies may be classified into level 0 to level 2 in which a driver controls the vehicle and a system is in charge of some driving functions, and level 3 to level 5 in which the system controls the vehicle while being in charge of the whole driving function.

In more detail, level 0 allows the driver to totally control the vehicle, level 1 allows the vehicle system to assist some driving actions, such as steering, accelerating, or decelerating by the driver, and level 2 allows the system to perform some driving actions, such as steering, accelerating, or decelerating, under the situation that the driver watches the driving actions. Level 3 allows the system to perform autonomous driving in some sections, and allows the driver to be involved in the autonomous driving, when a sudden situation occurs. Meanwhile, level 4 may allow the system to control all safety situations in the state that the driver on board is not involved in the driving. Level 5, which is the final stage, is a stage in which the vehicle autonomously controls all driving situations to a destination without the driver. In addition, the autonomous driving is divided into level 3 for partial autonomous driving and level 4 for conditional autonomous driving, depending on whether to the driver is involved.

Meanwhile, although a cybersecurity technology of the autonomous driving vehicle has been defined recently, there is no explicit suggestion on a method for coping with when hacking occurs in the system.

Accordingly, when hacking occurs in the vehicle in level 4 of autonomous driving, definition of operations of relevant controllers with respect to vehicle functions and a method for controlling the operations.

SUMMARY

The present disclosure has been made to solve the above-mentioned problems occurring in the prior art while advantages achieved by the prior art are maintained intact.

An aspect of the present disclosure provides an apparatus for controlling a vehicle and a method for the same, capable of controlling operations of relevant controllers, when a controller is hacked in an autonomous driving vehicle.

Another aspect of the present disclosure provides an apparatus for controlling a vehicle and a method for the same, enabling a system to perform a fallback function in level 4 of autonomous driving, when hacking occurs in a vehicle.

Another aspect of the present disclosure provides an apparatus for controlling a vehicle and a method for the same, capable of generating an entry path such that a vehicle enters a safety zone and of adjusting performance of vehicle controllers, which hacking occurs in a vehicle.

The technical problems to be solved by the present disclosure are not limited to the aforementioned problems, and any other technical problems not mentioned herein will be clearly understood from the following description by those skilled in the art to which the present disclosure pertains.

According to one or more embodiments of the present disclosure, an apparatus may include: a plurality of controllers configured to control a vehicle; a hacking monitoring system configured to monitor for a hacking attempt against the vehicle; and a vehicle control device configured to: detect a safety zone in front of the vehicle; set an entry path for entering the safety zone; and adjust, based on detecting the hacking attempt and based on an entry state to the entry path, performance of the plurality of controllers.

The vehicle control device may be further configured to: set split regions by virtually splitting a road in front of the vehicle in a longitudinal direction, corresponding to a forward direction of the vehicle, and in a lateral direction perpendicular to the longitudinal direction; and set, as the safety zone, a region that is present at a last position in a diagonal direction from the vehicle, of the split regions.

The split regions may include a first row region, a second row region, and a third row region. The first row region may correspond to the forward direction of the vehicle. The second row region may correspond to a primary safety zone including a shoulder of the road. The third row region may correspond to a secondary safety zone including the safety zone.

The vehicle control device may be configured to: adjust the performance of the plurality of controllers to be reduced in a preset range, after the vehicle enters the primary safety zone in the first row region.

The vehicle control device may be configured to: adjust the performance of the plurality of controllers to be stopped, after the vehicle enters the safety zone.

The plurality of controllers may include at least one of: an electronic control unit, an engine control unit, a motor control unit, a fuel control unit, a transmission control unit, a brake controller, a steering controller, or an advanced driver assistance system (ADAS) controller. The vehicle control device may be further configured to: stop a function of a controller, of the plurality of controllers, that was hacked and reduce performance of one or more remaining controllers, of the plurality of controllers, to be in a preset range, after the vehicle enters a primary safety zone, based on the hacking attempt being detected in at least one of the electronic control unit, the engine control unit, the motor control unit, the fuel control unit, or the transmission control unit.

The vehicle control device may be configured to, based on the hacking attempt being detected in the brake controller: stop a function of the brake controller and reduce performance of the one or more remaining controllers to be in the preset range, after the vehicle enters the primary safety zone.

The vehicle control device may be configured to, based on the hacking attempt being detected in the steering controller: stop a function of the steering controller; control the electronic control unit, the engine control unit, the motor control unit, and the fuel control unit to prevent the vehicle from being accelerated; and control the brake controller and the ADAS controller to stop functions of the brake controller and the ADAS controller after a specific time is elapsed.

The vehicle control device may be configured to, based on the hacking attempt being detected in the ADAS controller: stop a function of the ADAS controller; control the electronic control unit, the engine control unit, the motor control unit, and the fuel control unit to prevent the vehicle from being accelerated; and control the brake controller and the steering controller to stop functions of the brake controller and the steering controller after a specific time is elapsed.

The plurality of controllers may further include a gateway for vehicle networking. The vehicle control device may be configured to, based on the hacking attempt being detected in the gateway: stop a function of the gateway; control the electronic control unit, the engine control unit, the motor control unit, and the fuel control unit to prevent the vehicle from being accelerated; and control the brake controller, the steering controller, and the ADAS controller to stop functions of the brake controller, the steering controller, and the ADAS controller after a specific time is elapsed.

According to one or more embodiments of the present disclosure, a method may include: monitoring for a hacking attempt in a vehicle including a plurality of controllers; detecting a safety zone in front of the vehicle; setting an entry path for entering the safety zone; and after detecting the hacking attempt, controlling the vehicle by adjusting performance of the plurality of controllers based on an entry state into the entry path.

Setting the entry path may include: setting split regions by virtually splitting a road in front of the vehicle in a longitudinal direction, corresponding to a forward direction of the vehicle, and in a lateral direction perpendicular to the longitudinal direction; and setting, as the safety zone, a region that is present at a last position in a diagonal direction from the vehicle, of the split regions.

The split regions may include a first row region, a second row region, and a third row region. The first row region may correspond to the forward direction of the vehicle. The second row region may correspond to a primary safety zone including a shoulder of the road. The third row region may correspond to a secondary safety zone including the safety zone.

Controlling the vehicle may include: adjusting the performance of the plurality of controllers to be reduced in a preset range, after the vehicle enters the primary safety zone in the first row region.

Controlling the vehicle may include: adjusting the performance of the plurality of controllers to be stopped, after the vehicle enters the safety zone.

The plurality of controllers may include at least one of: an electronic control unit, an engine control unit, a motor control unit, a fuel control unit, a transmission control unit, a brake controller, a steering controller, or an advanced driver assistance system (ADAS) controller. Controlling the vehicle may include: stopping a function of a controller, of the plurality of controllers, that was hacked and reducing performance of one or more remaining controllers, of the plurality of controllers, to be in a preset range, after the vehicle enters a primary safety zone, based on the hacking attempt being detected in at least one of the electronic control unit, the engine control unit, the motor control unit, the fuel control unit, or the transmission control unit.

Controlling the vehicle may include, based on the hacking attempt being detected in the brake controller: stopping a function of the brake controller and reduce performance of the one or more remaining controllers to be in the preset range, after the vehicle enters the primary safety zone.

Controlling the vehicle may include, based on the hacking attempt being detected in the steering controller: stopping a function of the steering controller; controlling the electronic control unit, the engine control unit, the motor control unit, and the fuel control unit to prevent the vehicle from being accelerated; and controlling the brake controller and the ADAS controller to stop functions of the brake controller and the ADAS controller after a specific time is elapsed.

Controlling the vehicle may include, based on the hacking attempt being detected in the ADAS controller: stopping a function of the ADAS controller; controlling the electronic control unit, the engine control unit, the motor control unit, and the fuel control unit to prevent the vehicle from being accelerated; and controlling the brake controller and the steering controller to stop functions of the brake controller and the steering controller after a specific time is elapsed.

The plurality of controllers may further include a gateway for vehicle networking. Controlling the vehicle may include, based on the hacking attempt being detected in the gateway: stopping a function of the gateway; controlling the electronic control unit, the engine control unit, the motor control unit, and the fuel control unit to prevent the vehicle from being accelerated; and controlling the brake controller, the steering controller, and the ADAS controller to stop functions of the brake controller, the steering controller, and the ADAS controller after a specific time is elapsed.

According to one or more embodiments of the present disclosure, a method may include: detecting, by a vehicle, a hacking attempt to one or more controllers of the vehicle; determining a risk level based on a controller, of the one or more controllers, being targeted by the hacking attempt; and performing, based on the risk level, adjust operations of the one or more controllers.

BRIEF DESCRIPTION OF THE DRAWINGS

The above and other objects, features and advantages of the present disclosure will be more apparent from the following detailed description taken in conjunction with the accompanying drawings:

FIG. 2 is a view illustrating a function of an autonomous driving vehicle based on levels;

FIG. 8 is a view illustrating operations of controllers when hacking occurs.

DETAILED DESCRIPTION

Figure 1:
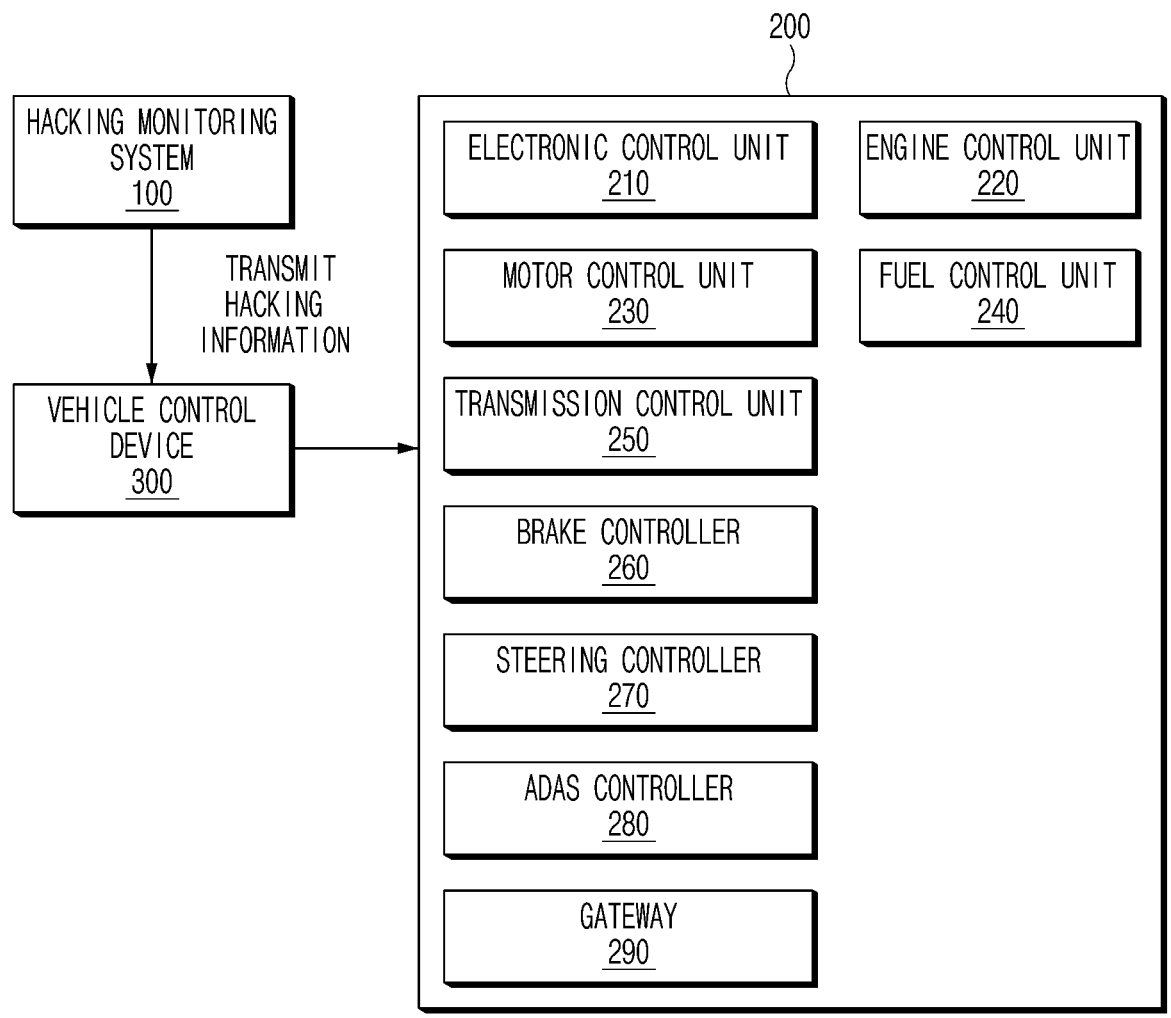
FIG. 1 is a control block diagram illustrating an apparatus for controlling a vehicle.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, a detailed description of well-known features or functions will be ruled out in order not to unnecessarily obscure the gist of the present disclosure.

In describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 9.

FIG. 1 is a control block diagram illustrating the structure of a vehicle control device.

Referring to FIG. 1, the vehicle control device may be implemented inside a vehicle. In this case, the vehicle control device may be formed integrally with the internal control units of the vehicle or may be implemented separately from the internal control units of the vehicle to be connected with the internal control units of the vehicle through a separate connector.

As illustrated in accompanying drawings, the vehicle control system may include a hacking monitoring system 100, a vehicle controller 200 (also referred to as a controller) to perform the function of the vehicle, and a vehicle control device 300 to control the hacking monitoring system 100 and the vehicle controller 200. The vehicle controller 200 may include a plurality of components to perform the function of the vehicle. For example, the vehicle control device 300 may include an electronic control unit (ECU) 210, an engine control unit (ECU) 220, a motor control unit (MCU) 230, a fuel control unit (FCU) 240, a transmission control unit (TCU) 250, a brake controller 260, a steering controller 270, an advanced driver assistance system (ADAS) controller 280, and a gateway 290.

Components constituting the vehicle control system are not essentially referred to as separate devices physically distinguished from each other. In other words, the hacking monitoring system 100, the vehicle controller 200, and the vehicle control device 300 of FIG. 1 are hardware units constituting the vehicle control system, which are merely functionally divided into each other based on operations performed by the hardware units, and the hardware units need not to be provided independently from each other. At least one of the hacking monitoring system 100, the vehicle controller 200, and the vehicle control device 300 may be implemented in the form of separate devices physically divided into each other.

Before the description according to the present disclosure, the function of the autonomous driving vehicle will be described in more detail.

FIG. 2 is a view illustrating the function of the autonomous driving vehicle based on levels.

As described above, the principle of classifying technical levels of an autonomous driving system is based on an ability to control steering and acceleration-deceleration, a monitoring ability of a driving environment, a fallback ability under a dynamic driving task (DDT) environment, and an operational design domain (ODD) range. Level 1 and level 2 of autonomous driving are related to the steering system, the brake system, and the acceleration system (ECU; TCU) to laterally or longitudinally control the vehicle. Level 3 of autonomous driving is related to the communication system (V2X) for communication with the outside in relation to the driving environment. In level 4 of autonomous driving, the redundancy system for the fallback function is provided.

As illustrated in FIG. 2, level 3 and level 4 may be determined depending on whether the fallback function for an accident is performed by the system or a driver.

The fallback is classified in level 4 of an autonomous driving system, if the system is able to cope with all dangerous situations. According to level 4, the system makes all decisions in an ODD region designed by the system, and may high-automation drive without requesting the transfer of the right of control to the driver until reaching an ODD boundary. In level 4 of autonomous driving, a driver does not maintain an alert state in an emergency situation. In other words, in level 4, the system performs a condition of minimizing a risk regardless of the handling of the driver.

The fallback refers to a function (e.g., a deceleration function or a stop (e.g., pull-over) function on the shoulder of a road) performed by a system to minimize the risk caused by driving, based on the self-determination of the system, if the operation of the autonomous driving system and a control-related function are not normally performed due to the failure or the deviation out of a drivable region, or the driving to a set destination is difficult.

Meanwhile, most vehicle electronic systems are controlled by an electronic control unit (ECU) to transmit or receive data through a controller area network (CAN) bus. The ECU provided in the vehicle is uniquely specified with a processor ID and a communication encryption key. Accordingly, the ECU determines the processor ID and the communication encryption key through program whenever the communication is made, and issues a command for blocking the communication if hacking (e.g., a hacking attempt) is suspected. However, as hacking is advanced, all software operations of the ECU may be modulated. Accordingly, normal communication data transmitted on the CAN bus may be monitored, the processor ID and the encryption key may be inferred and forged, and the command for blocking the communication may be ignored. Accordingly, to fundamentally prevent communication interference and malicious data transmission by hacking, communication of a hacked node should be blocked in hardware on the CAN bus.

To block the node that has been already hacked to interfere with CAN communication and to transmit malicious data, an individual node should be uniquely specified on the CAN bus. However, there is no function, such as Media Access Control (MAC) address over an Ethernet, for identifying the individual node.

To cope with CAN bus attacks, the Intrusion Detection System (IDS) analyzes the content of the data frame to determine whether a node currently transmitting data is a hacked node. The IDS may always monitor the CAN bus, and a certain node may transmit a malicious data frame. In this case, the IDS may analyze the data content to detect that the node has been hacked.

Meanwhile, for hacking attempts that CAN IDS cannot detect, controller integrity is currently determined in real time using MAC.

The following description according to the present disclosure will be made regarding a subsequent control manner to be performed, if the hacking state of the controller is detected in an autonomous driving vehicle in level 4.

Referring back to FIG. 1, the hacking monitoring system 100 of the vehicle control system may monitor for any hacking attempts (e.g., whether hacking occurs) in the vehicle and transmit the hacking information to the vehicle control device 300.

The hacking monitoring system 100 may determine whether hacking occurs by verifying the integrity of the controller in real time. The hacking monitoring system 100 may include a detailed controller for the determination.

Figure 3:
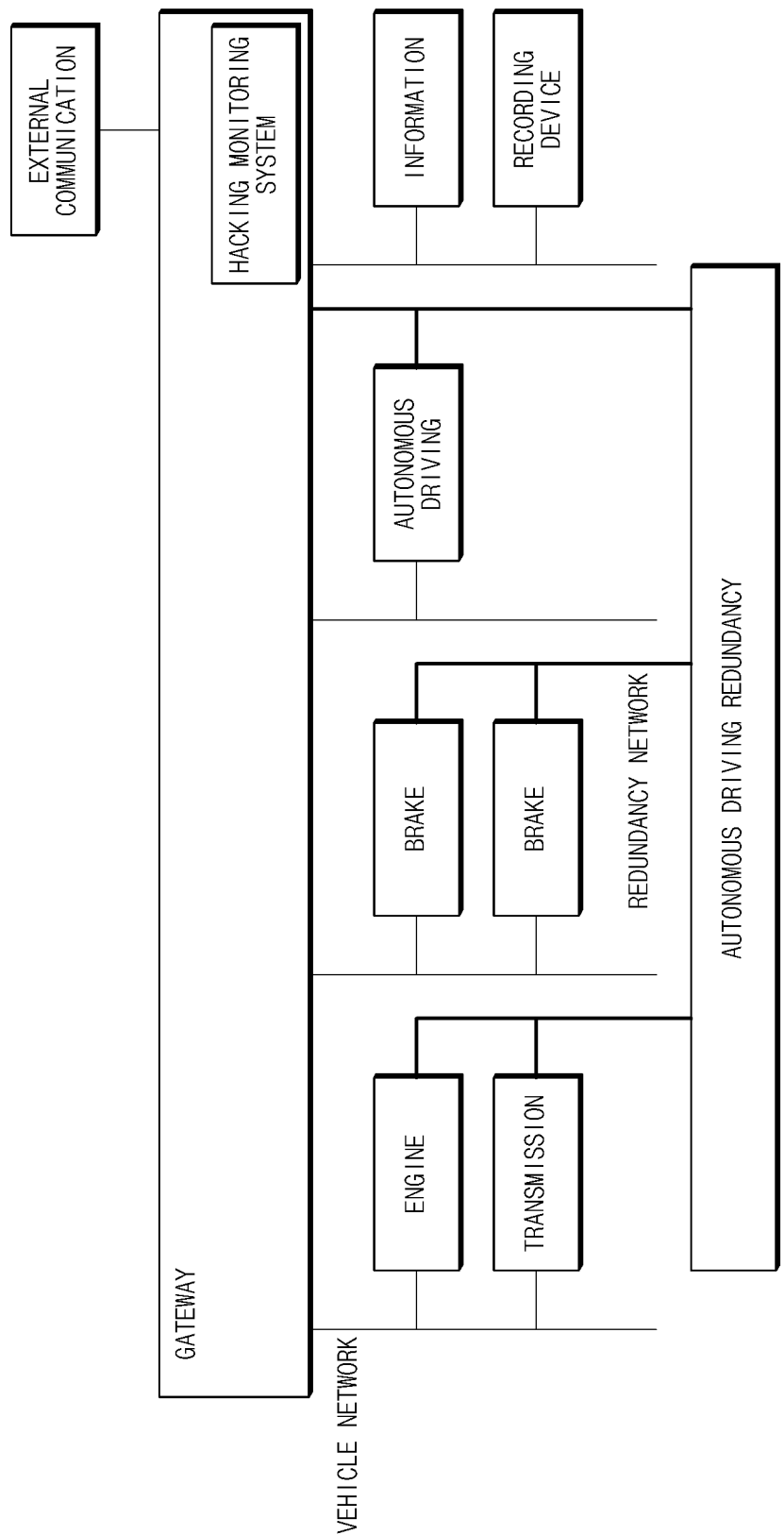
FIG. 3 is a view schematically illustrating a vehicle controller and a vehicle control system.

The vehicle controller 200 may be expressed as in Table 1 and schematized as in FIG. 3, depending on the functions of a vehicle to be performed by control systems.

TABLE 1

| Characteristic | Controller |
| --- | --- |
| Longitudinal acceleration | Engine controller (motor, fuel cell), transmission controller |
| Longitudinal deceleration | Brake controller |
| Lateral direction | Steering controller |
| Automation | Autonomous driving system (ADAS included) |
| Vehicle network | Gateway |
| External communication | Communication device |
| External communication | Communication device C-ITS |
| Information | AVN |
| Recording device | Accident recorder |

As shown in Table 1, an engine controller (corresponding to an engine control unit 220), a motor controller (corresponding to a motor control unit 230), a fuel cell controller (corresponding to a fuel control unit 240), and a transmission controller (corresponding to a transmission control unit 250), which are associated with engine control for longitudinally accelerating, may be included in the control system, and a brake controller for longitudinally decelerating, and a steering controller for lateral control may be included in the control system. In addition, an autonomous driving system including the ADAS for autonomous driving, a gateway for networking of a vehicle, a communication device for external communication, an audio, video, navigation (AVN) or infotainment that provides information and entertainment to a user, and an incident recorder to record events occurring in a vehicle may be included an in-vehicle control system.

FIG. 3 is a view schematically illustrating a vehicle controller and a vehicle control system.

Each controller is connected to a gateway for a vehicle network, and each controller is connected to an autonomous driving redundancy system for level 4 of autonomous driving. The hacking monitoring system is connected to the gateway to verify the real-time integrity of each controller.

If a hacking is sensed in the vehicle, the vehicle control device 300 may detect a safety zone in front of the vehicle, set an entry path for entering the safety zone, and adjust the performance of the vehicle controller 200 depending on the entry state to the entry path.

Figure 4:
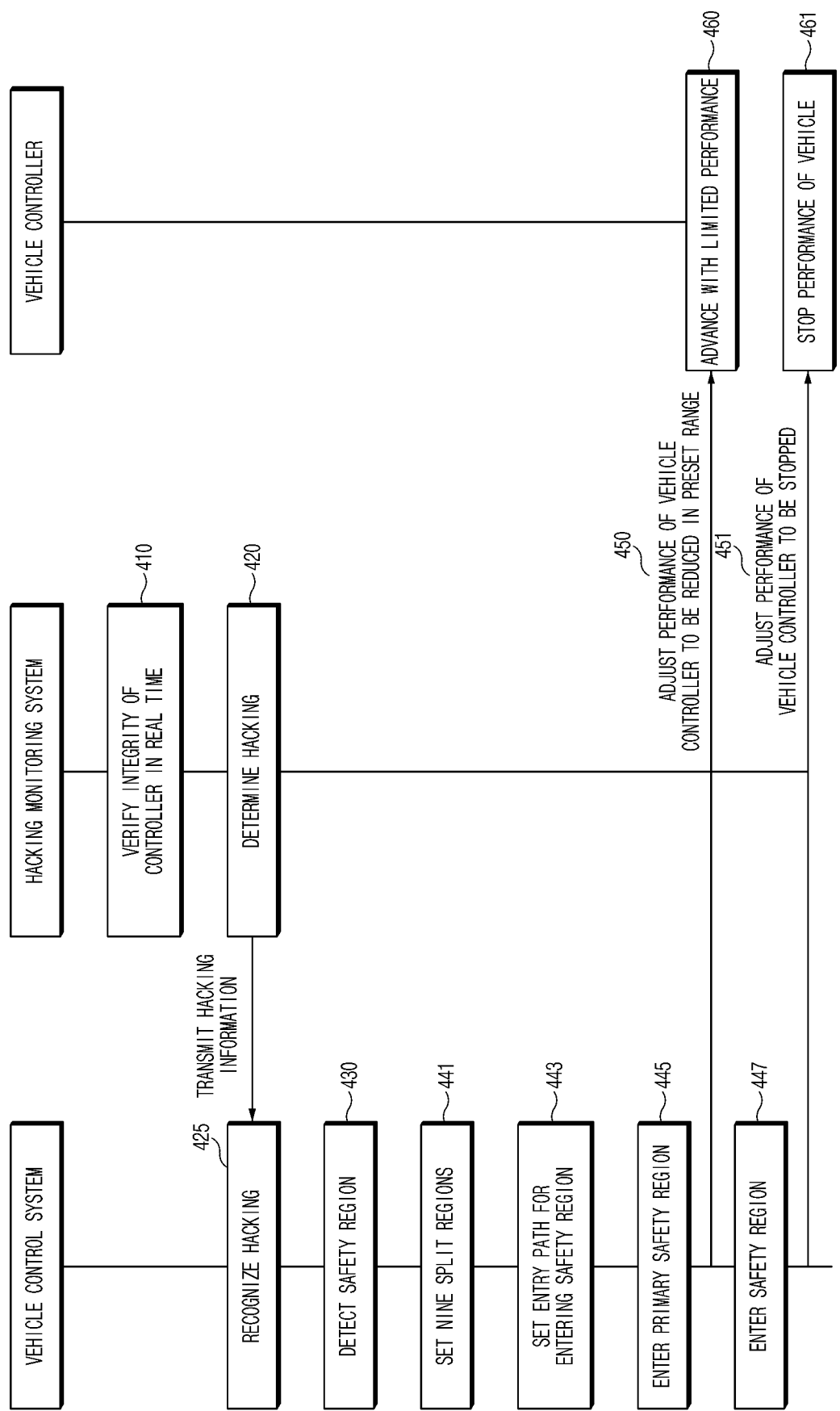
FIG. 4 is a control flowchart illustrating a method for controlling a vehicle.

FIG. 4 is a control flowchart illustrating a vehicle control method. The vehicle control method according to the present disclosure will be described in detail with reference to FIG. 4.

Hereinafter, it is assumed that the vehicle control system of FIG. 1 performs the process of FIG. 4. In addition, in the following description made with reference to FIG. 4, it may be understood that the described operation is controlled by each component of the vehicle control system.

First, the hacking monitoring system 100 verifies in real time whether hacking occurs in the vehicle (410).

If the hacking occurs, the hacking monitoring system 100 may determine the hacking (420), and transmit the determination to the vehicle control system corresponding to the vehicle control device 300 of FIG. 1 (420). The vehicle control system may recognize the hacking (425).

The vehicle control system detects a safety zone in front of the vehicle (430) and may set an entry path for entering into the safety zone (441, 443, 445, and 447).

The vehicle control system may adjust the performance of the vehicle controller depending on the entering state into the entry path (450 and 451).

Hereinafter, the procedure of generating the entry path for entering into the safety zone will be described with reference to FIGS. 5A to 7B.

The vehicle control system may detect a safety zone in front of the vehicle in a forward direction of the vehicle, preferably, in a right-upper portion direction or a left-upper portion direction of the drawing, and may virtually split a road to enter the safety zone, if hacking occurs in the vehicle advancing in the forward direction.

Figure 5A:
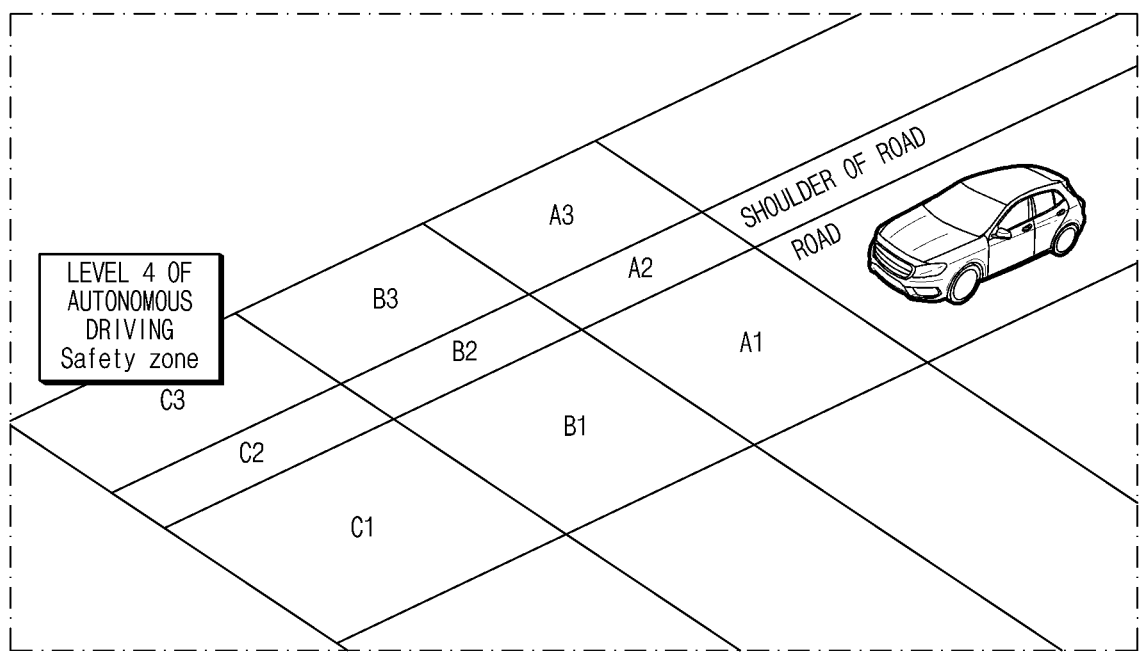
FIGS. 5A and 5B are views illustrating a split region.
Figure 5B:
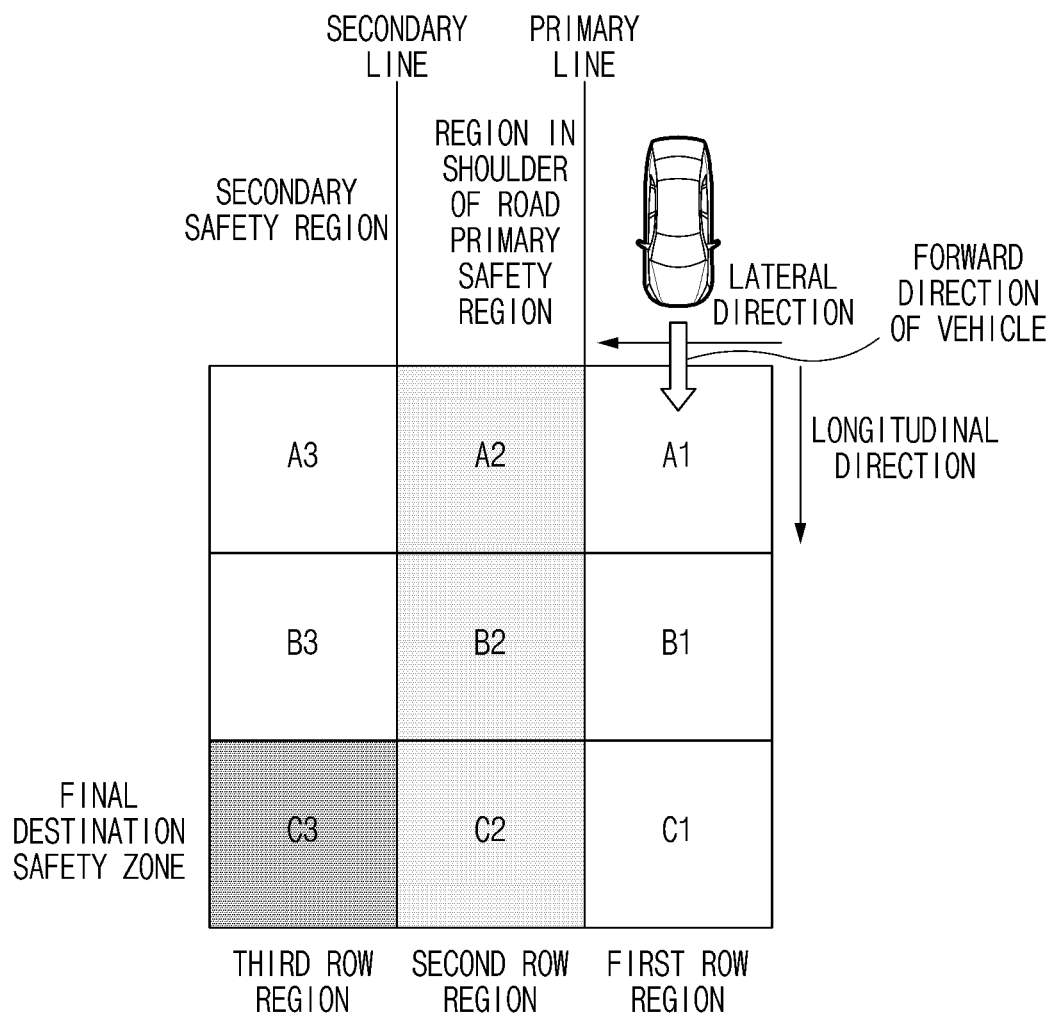

In other words, the vehicle control system may virtually split (e.g., divide, demarcate, etc.) the road, which is positioned in front of the vehicle, in a longitudinal direction corresponding to the forward direction of the vehicle and a lateral direction perpendicular to the longitudinal direction, to set the entry path such that nine split regions are set as illustrated in FIGS. 5A and 5B (441).

FIGS. 5A and 5B are views illustrating a split region.

As illustrated in the drawing, the split region may include a first row region, a second row region, and a third row region, and may be split into three regions in the lateral direction. In other words, nine split regions may be formed.

The first row region may correspond to the forward direction of the vehicle, the second row region may correspond to a primary safety zone including the shoulder region. The third row region may correspond to a secondary safety zone including the safety zone. Although illustrated, the safety area may be the last zone, which is positioned in the forward direction of the vehicle, in the third row region, that is, a zone farthest away from the vehicle in a diagonal direction from the vehicle. The vehicle is controlled to enter the safety zone of the third row region at the final stage.

The vehicle may enter the second row region by crossing a primary line from the first row region, and may stepwise enter the third row region by crossing a secondary line.

Figure 6:
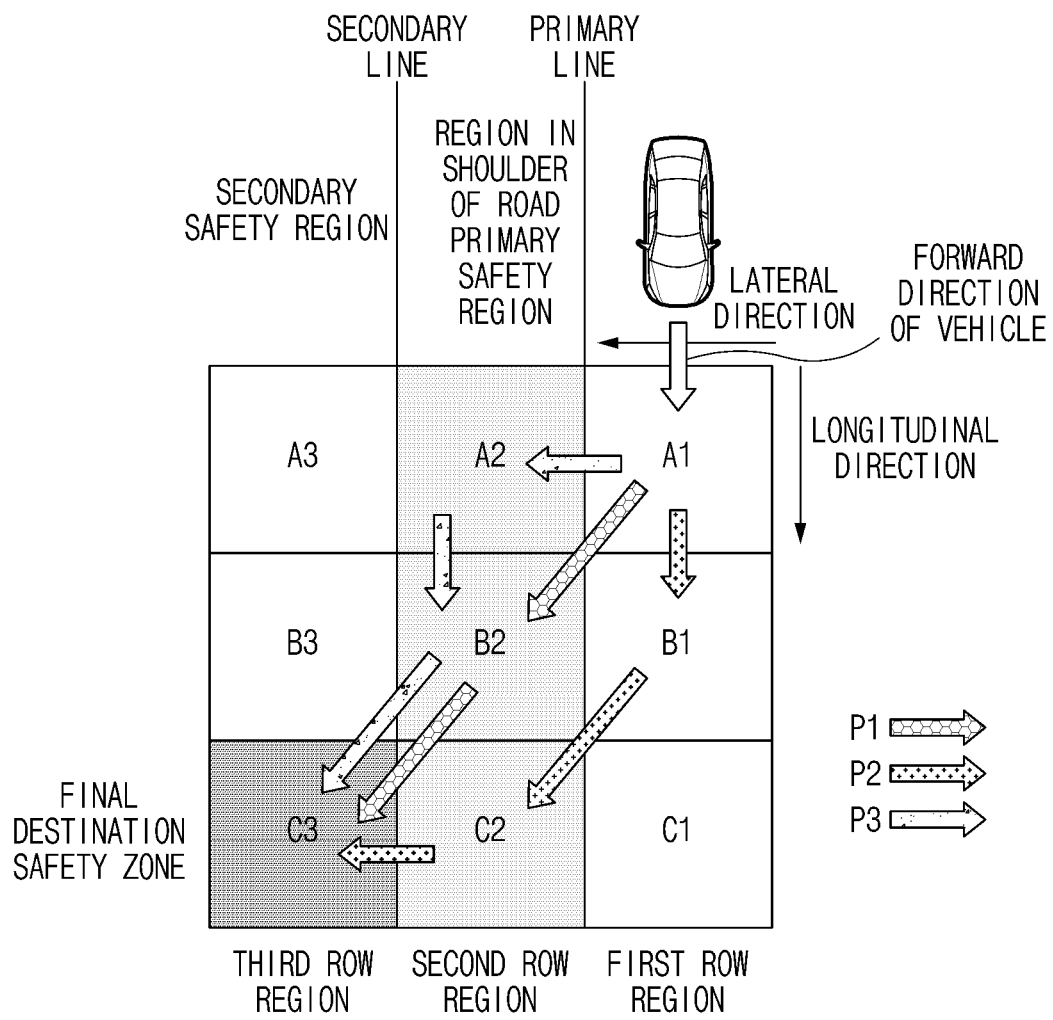
FIG. 6 is a view illustrating an entry path into a safe region.

The vehicle control system may set the entry path to enter the safety zone as illustrated in FIG. 6 (443).

FIG. 6 is a view illustrating the entry path into the safety zone.

FIG. 6 illustrates the entry path of the vehicle. For example, the entry path may be divided into a first path (P1), a second path (P2), and a third path (P3).

The entry path may be set based on the width of the shoulder of the road, the road state of the shoulder of the road, the speed of a vehicle, a distance to a surrounding vehicle, or the speed of the surrounding vehicle.

The first path (P1) is to move from region A1 to region B2 and from the region B2 to region C3 which is the safety zone. The second path (P2) is to move from region A1 to region B1, from region B1 to region C2, and from region C2 to region C3. The third path (P3) is to move from region A1 to region B2 through region A2 positioned in the second row region, and from region B2 to region C3.

Figure 7A:
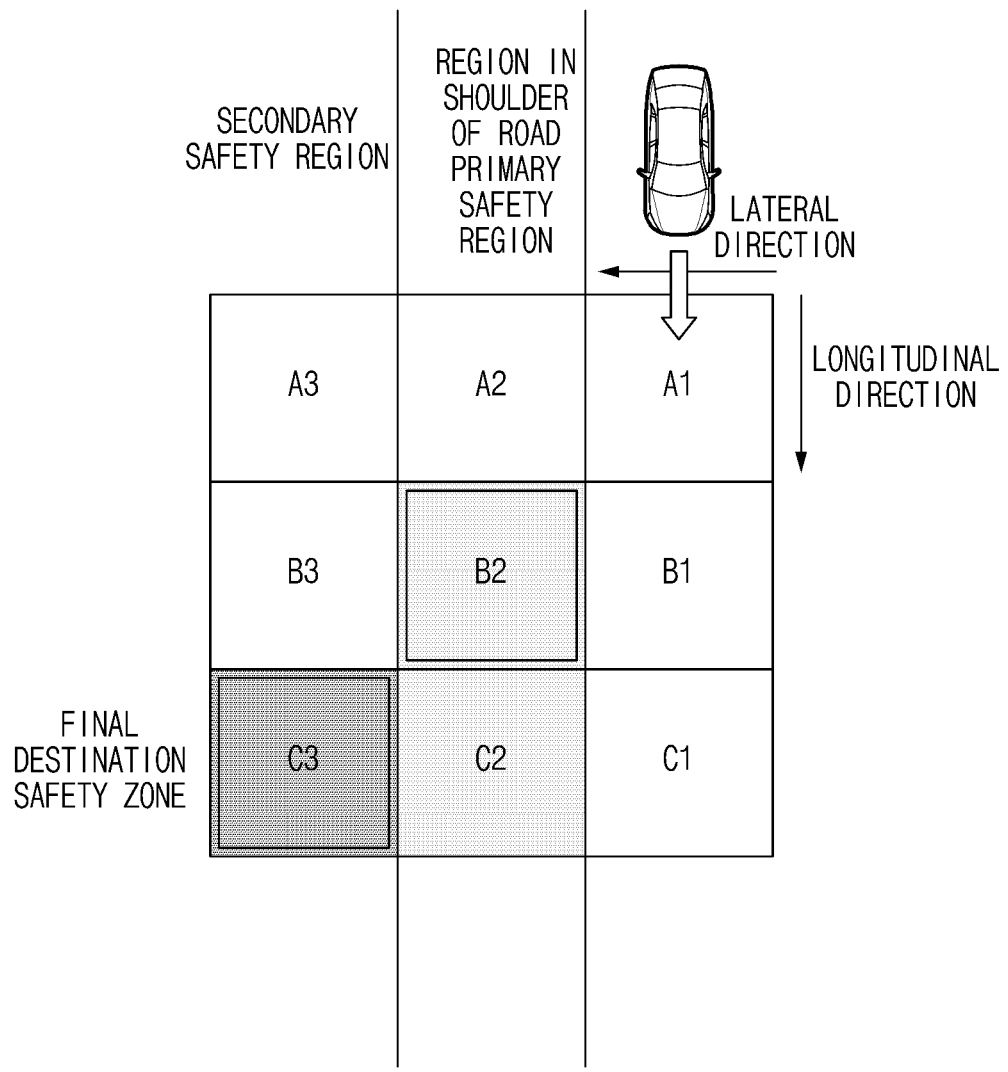
FIGS. 7A and 7B are view illustrating the entrance into a safe region.
Figure 7B:
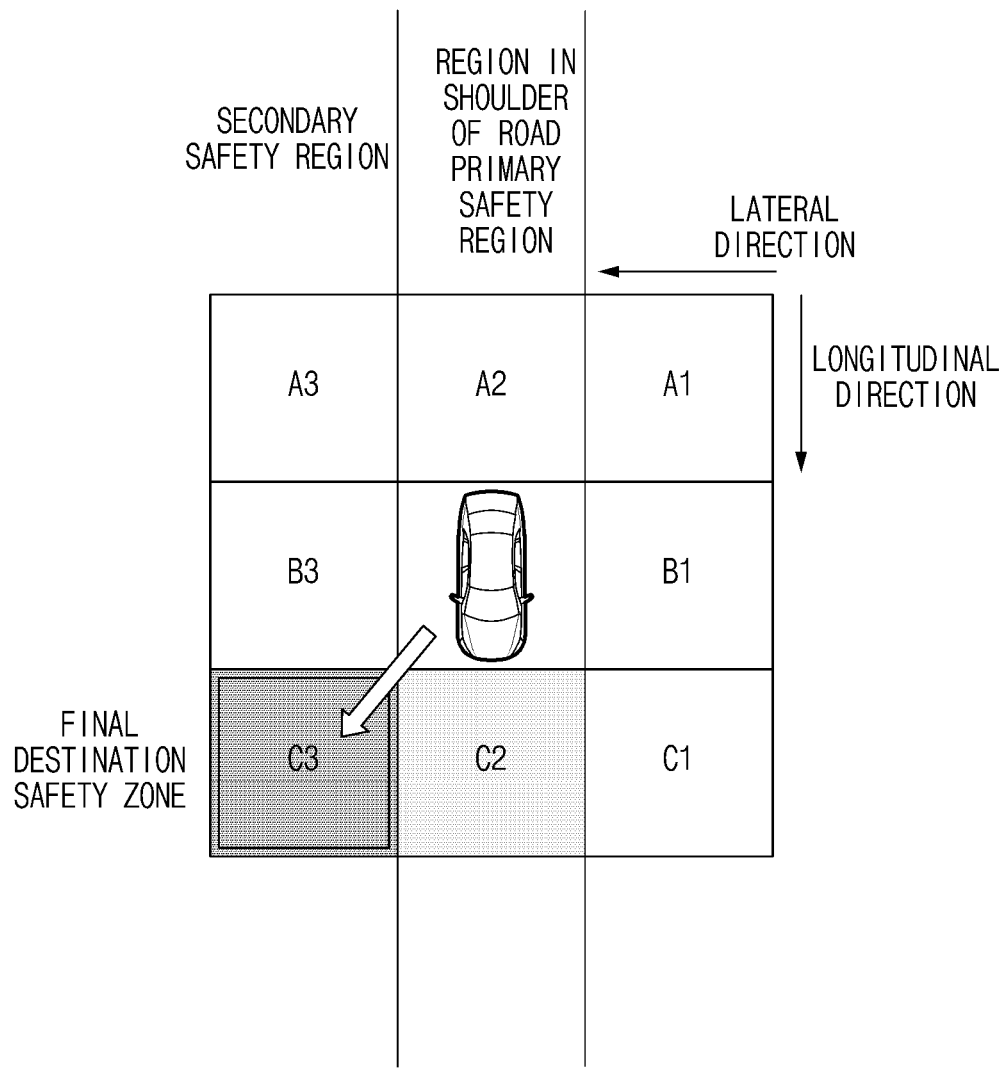

FIGS. 7A and 7B are views illustrating the entrance into the safety zone.

If the entry path is the first path (P1), the vehicle may enter the safety zone as illustrated in FIGS. 7A and 7B.

The vehicle may enter region B2 from region A1 while considering a current speed, as illustrated in FIG. 7A.

The longitudinal-direction length may be increased to enter the first safety zone in the first row region when considering the current speed of the vehicle. For example, the moving path may be set while determining the shoulder of the road, the present road, and the final destination, instead of an absolute distance (m), for example, the region B2 within the distance of 100 m.

The vehicle may move to region C2 after moving region B1, if it is difficult to move to region B2 based on the situation of the shoulder of the road.

After entering the first safety zone, the vehicle may set a path to arrive at the final safety region (also referred to as a safety zone), as illustrated in FIG. 7B.

In this case, if the vehicle enters the primary line and is positioned in the first safety zone, such as, regions A2, B2, and C2, the performance of the vehicle may be controlled to be reduced as compared to the performance of the vehicle in the normal operation (450). In other words, the vehicle may move to region C3, which is the final destination, with the reduced performance.

In summary, if the entry path of the vehicle is set, or if the entry path is set stepwise, the vehicle may enter the first safety zone (445), and the vehicle control system may adjust the performance of the vehicle controller to be reduced within a preset range (450). Accordingly, the vehicle may drive with the restricted performance, as the vehicle enters the first safety region (460).

Thereafter, if the vehicle enters the safety zone in the second safety region, the vehicle control system may adjust the performance of the vehicle controller to be stopped (451). Accordingly, the performance of the vehicle is stopped (461).

The following description will be made regarding a manner for reducing performance between relevant controllers depending on vehicle controllers having hacking.

Table 2 shows an emergency driving level, and the control of the vehicle controllers 200 depending on the risk levels.

TABLE 2

| Operating item | Risk level | Hacking controller | Countermeasures |
| --- | --- | --- | --- |
| Normal operation | lv0 | Controllers except for following controllers | Normally operate identically to existing operation |
| Limit operation in specific region | lv1 | External communication controller | Normally operate in addition to region requiring cooperation autonomous driving (ex C-ITS) |
| Risk minimization | lv2 | Engine, transmission, brake | Control autonomous system stepwise to guide to safety region |
| Sudden stop | lv3 | Steering, ADAS, gateway | Function stopped because guide to safety region is difficult due to loss in function of main controller |

As illustrated in the table, if hacking occurs in the external communication controller, the vehicle may be driven in a specific-zone restriction driving mode. The vehicle control device 300 may control the vehicle controller 200 such that cooperative autonomous driving (ex C-ITS) normally operates in addition to a necessary region.

If hacking occurs in the engine, transmission, and brake, the vehicle is in risk level 2 (lv2), and the vehicle may be driven in a risk minimization driving mode. The vehicle control device 300 may control the autonomous driving system stepwise such that the vehicle is guided to the safe region.

If a vehicle controller, such as steering, ADAS, or gateway, is hacked, the vehicle control device 300 may stop the function of the vehicle because it may be difficult to guide the safety region due to the loss of a main controller function. Meanwhile, if the steering controller is hacked, it is difficult to stepwise guide a safe region. Accordingly, the vehicle control device 300 may stop the function of the vehicle as if the vehicle stops functioning if the fuel is insufficient.

FIG. 8 is a view illustrating operations of controllers, when the hacking occurs. FIG. 8 is a more specific example of Table 2, which shows changes in the operation and performance of other control systems if hacking occurs in each control system of the vehicle controller 200.

As illustrated in the drawing, if at least one of the electronic control unit 210, the engine control unit 220, the motor control unit 230, the fuel control unit 240, and the transmission control unit 250 related to longitudinally accelerating is hacked, the vehicle control device 300 may stops the function of the vehicle controller hacked and may normally operate the performance of remaining vehicle controllers until the vehicle enters the primary safety zone. After the vehicle enters the first safety zone, the vehicle control device 300 may decrease the performance of the remaining vehicle controllers into a preset range.

In addition, if the brake controller 260 is hacked in relation to the longitudinally decelerating, the vehicle control device 300 may stop the function of the brake controller 260 and may normally operate the performance of the remaining vehicle controllers until the vehicle enters the primary safety zone. After the vehicle enters the first safety zone, the vehicle control device 300 may decrease the performance of the remaining vehicle controllers into a preset range.

If the steering controller related to lateral control of the vehicle is hacked, the vehicle control device 300 may stop the function of the steering controller 270, may control the electronic control unit 210, the engine control unit 220, the motor control unit 230, and the fuel control unit 240, such that the vehicle is not accelerated, and may control the brake controller 260 and the ADAS control device 280 such that the function is stopped after a specific time is elapsed.

If the ADAS controller 280 related to the autonomous driving is hacked, the vehicle control device 300 may stop the function of the ADAS controller 280, may control the electronic control unit 210, the engine control unit 220, the motor control unit 230, and the fuel control unit 240, such that the vehicle is not accelerated, and may control the brake controller 260 and the steering controller 270 such that the function is stopped after a specific time is elapsed.

If the gateway 290 for the vehicle networking is hacked, the vehicle control device 300 may stop the function of the gateway 290, may control the electronic control unit 210, the engine control unit 220, the motor control unit 230, and the fuel control unit 240, such that the vehicle is not accelerated, and may control the brake controller 260, the steering controller 270, and the ADAS controller 280 such that the function is stopped after a specific time is elapsed.

Remaining relevant controllers may be controlled to be normally operated in a specific region as illustrated in FIG. 8 or may be maintained to be normally operated. The AVN in charge of delivering information may indicate the fact that the hacking occurs and the operating state of the current controllers and may inform the fact that the hacking occurs and the operating state of the current controllers to the driver, except for the case that the AVN is hacked.

In summary, as described above, the present disclosure may suggest a method that the system of the autonomous driving vehicle in level 4 copes with for itself, if the hacking occurs. In particular, the vehicle control system proposes the countermeasure method depending on controllers (a longitudinal control, a lateral control, an ADAS, or a vehicle network control) involved in the autonomous driving level.

The apparatus and the method according to the present disclosure may be implemented in the form of a program instruction executed through various computer units, and the apparatus and the method may be recorded in a computer-readable medium. The apparatus and the method may include a program instruction, a data file, a data structure, and may be implemented with hardware to execute the operation and the algorithm of the present disclosure.

Figure 9:
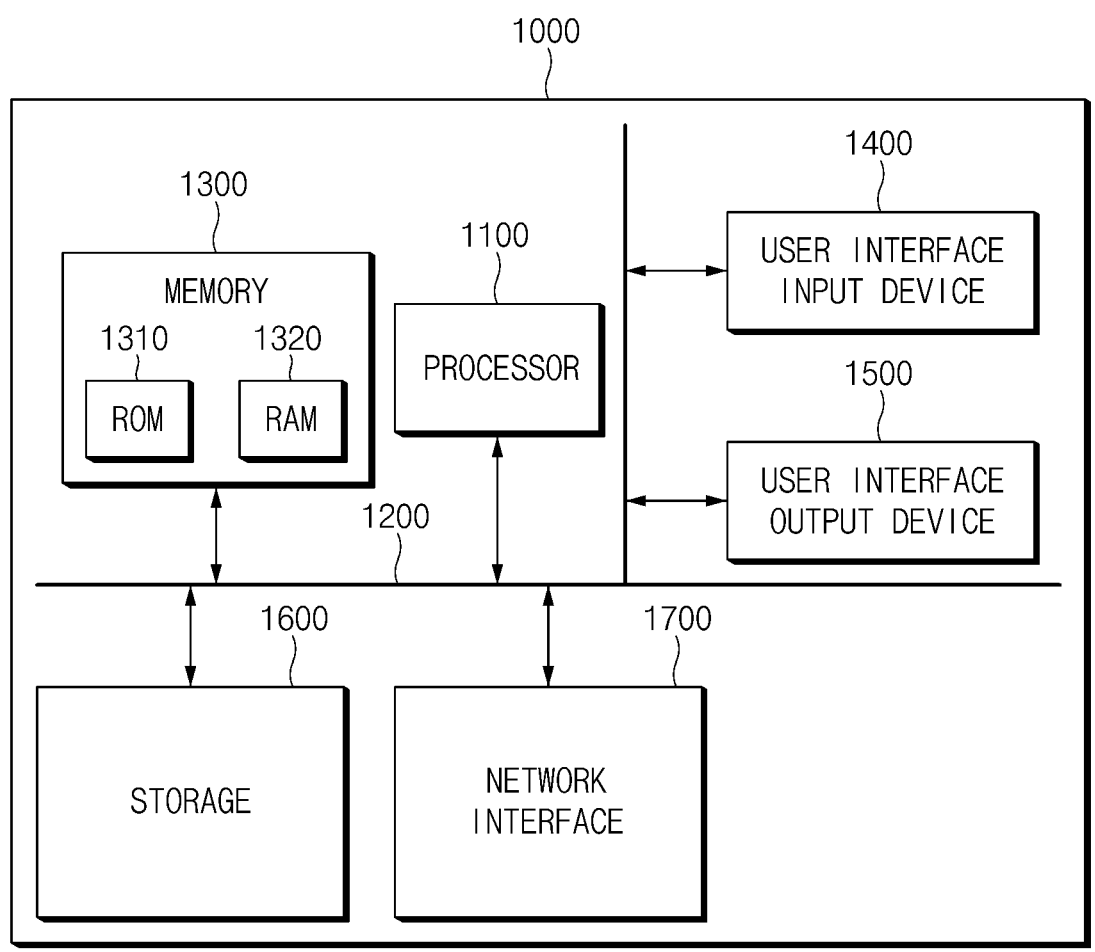
FIG. 9 illustrates a computing system.

FIG. 9 illustrates a computing system.

Referring to FIG. 9, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

The present disclosure may provide an apparatus for controlling a vehicle and a method for the same, capable of controlling operations of relevant controllers, if a controller is hacked in an autonomous driving vehicle.

The present disclosure provides an apparatus for controlling a vehicle and a method for the same, enabling a system to perform a fallback function in level 4 of autonomous driving.

The present disclosure provides an apparatus for controlling a vehicle and a method for the same, capable of generating an entry path such that a vehicle enters a safety zone and of adjusting performance of vehicle controllers, which hacking occurs in a vehicle.

Besides, a variety of effects directly or indirectly understood through the present disclosure may be provided.

The above description is merely an example of the technical idea of the present disclosure, and various modifications and modifications may be made by one skilled in the art without departing from the essential characteristic of the invention.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
   a plurality of controllers configured to control a vehicle;
   a controller configured to monitor for a hacking attempt against the vehicle; and
   a vehicle control device configured to:
      detect a safety zone in front of the vehicle;
      set an entry path for entering the safety zone; and
      adjust, based on detecting the hacking attempt and based on an entry state to the entry path, performance of the plurality of controllers.

2. The apparatus of claim 1, wherein the vehicle control device is further configured to:
   set split regions by virtually splitting a road in front of the vehicle in a longitudinal direction, corresponding to a forward direction of the vehicle, and in a lateral direction perpendicular to the longitudinal direction; and
   set, as the safety zone, a region that is present at a last position in a diagonal direction from the vehicle, of the split regions.

3. The apparatus of claim 2, wherein the split regions include a first row region, a second row region, and a third row region,
   wherein the first row region corresponds to the forward direction of the vehicle,
   wherein the second row region corresponds to a primary safety zone including a shoulder of the road, and
   wherein the third row region corresponds to a secondary safety zone including the safety zone.

4. The apparatus of claim 3, wherein the vehicle control device is configured to:
   adjust the performance of the plurality of controllers to be reduced in a preset range, after the vehicle enters the primary safety zone in the first row region.

5. The apparatus of claim 1, wherein the vehicle control device is configured to:
   adjust the performance of the plurality of controllers to be stopped, after the vehicle enters the safety zone.

6. The apparatus of claim 1, wherein the plurality of controllers comprise at least one of:
electronic control circuitry,
engine control circuitry,
motor control circuitry,
fuel control circuitry,
transmission control circuitry,
a brake controller,
a steering controller, or
an advanced driver assistance system (ADAS) controller, and
wherein the vehicle control device is further configured to:
stop a function of a controller, of the plurality of controllers, that was hacked and reduce performance of one or more remaining controllers, of the plurality of controllers, to be in a preset range, after the vehicle enters a primary safety zone, based on the hacking attempt being detected in at least one of the electronic control circuitry, the engine control circuitry, the motor control circuitry, the fuel control circuitry, or the transmission control circuitry.

7. The apparatus of claim 6, wherein the vehicle control device is configured to, based on the hacking attempt being detected in the brake controller:
stop a function of the brake controller and reduce performance of the one or more remaining controllers to be in the preset range, after the vehicle enters the primary safety zone.

8. The apparatus of claim 6, wherein the vehicle control device is configured to, based on the hacking attempt being detected in the steering controller:
stop a function of the steering controller;
control the electronic control circuitry, the engine control circuitry, the motor control circuitry, and the fuel control circuitry to prevent the vehicle from being accelerated; and
control the brake controller and the ADAS controller to stop functions of the brake controller and the ADAS controller after a specific time is elapsed.

9. The apparatus of claim 6, wherein the vehicle control device is configured to, based on the hacking attempt being detected in the ADAS controller:
stop a function of the ADAS controller;
control the electronic control circuitry, the engine control circuitry, the motor control circuitry, and the fuel control circuitry to prevent the vehicle from being accelerated; and
control the brake controller and the steering controller to stop functions of the brake controller and the steering controller after a specific time is elapsed.

10. The apparatus of claim 6, wherein the plurality of controllers further comprise a gateway for vehicle networking, and
wherein the vehicle control device is configured to, based on the hacking attempt being detected in the gateway:
stop a function of the gateway;
control the electronic control circuitry, the engine control circuitry, the motor control circuitry, and the fuel control circuitry to prevent the vehicle from being accelerated; and
control the brake controller, the steering controller, and the ADAS controller to stop functions of the brake controller, the steering controller, and the ADAS controller after a specific time is elapsed.

11. A method comprising:
monitoring for a hacking attempt in a vehicle including a plurality of controllers;
detecting a safety zone in front of the vehicle;
setting an entry path for entering the safety zone; and
after detecting the hacking attempt, controlling the vehicle by adjusting performance of the plurality of controllers based on an entry state into the entry path.

12. The method of claim 11, wherein the setting of the entry path comprises:
setting split regions by virtually splitting a road in front of the vehicle in a longitudinal direction, corresponding to a forward direction of the vehicle, and in a lateral direction perpendicular to the longitudinal direction; and
setting, as the safety zone, a region that is present at a last position in a diagonal direction from the vehicle, of the split regions.

13. The method of claim 12, wherein the split regions include a first row region, a second row region, and a third row region,
wherein the first row region corresponds to the forward direction of the vehicle,
wherein the second row region corresponds to a primary safety zone including a shoulder of the road, and
wherein the third row region corresponds to a secondary safety zone including the safety zone.

14. The method of claim 13, wherein the controlling of the vehicle comprises:
adjusting the performance of the plurality of controllers to be reduced in a preset range, after the vehicle enters the primary safety zone in the first row region.

15. The method of claim 11, wherein the controlling of the vehicle comprises:
adjusting the performance of the plurality of controllers to be stopped, after the vehicle enters the safety zone.

16. The method of claim 11, wherein the plurality of controllers comprise at least one of:
electronic control circuitry,
engine control circuitry,
motor control circuitry,
fuel control circuitry,
transmission control circuitry,
a brake controller,
a steering controller, or
an advanced driver assistance system (ADAS) controller, and
wherein the controlling of the vehicle comprises:
stopping a function of a controller, of the plurality of controllers, that was hacked and reducing performance of one or more remaining controllers, of the plurality of controllers, to be in a preset range, after the vehicle enters a primary safety zone, based on the hacking attempt being detected in at least one of the electronic control circuitry, the engine control circuitry, the motor control circuitry, the fuel control circuitry unit, or the transmission control circuitry.

17. The method of claim 16, wherein the controlling of the vehicle comprises, based on the hacking attempt being detected in the brake controller:
stopping a function of the brake controller and reduce performance of the one or more remaining controllers to be in the preset range, after the vehicle enters the primary safety zone.

18. The method of claim 16, wherein the controlling of the vehicle comprises, based on the hacking attempt being detected in the steering controller:

stopping a function of the steering controller;

controlling the electronic control circuitry, the engine control circuitry, the motor control circuitry, and the fuel control circuitry to prevent the vehicle from being accelerated; and controlling the brake controller and the ADAS controller to stop functions of the brake controller and the ADAS controller after a specific time is elapsed.

19. The method of claim 16, wherein the controlling of the vehicle comprises, based on the hacking attempt being detected in the ADAS controller:

stopping a function of the ADAS controller;

controlling the electronic control circuitry, the engine control circuitry, the motor control circuitry, and the fuel control circuitry to prevent the vehicle from being accelerated; and controlling the brake controller and the steering controller to stop functions of the brake controller and the steering controller after a specific time is elapsed.

20. The method of claim 16, wherein the plurality of controllers further comprise a gateway for vehicle networking, and wherein the controlling of the vehicle comprises, based on the hacking attempt being detected in the gateway:

stopping a function of the gateway;

controlling the electronic control circuitry, the engine control circuitry, the motor control circuitry, and the fuel control circuitry to prevent the vehicle from being accelerated; and controlling the brake controller, the steering controller, and the ADAS controller to stop functions of the brake controller, the steering controller, and the ADAS controller after a specific time is elapsed.

* * * * *